US010444392B2

United States Patent
Milne et al.

(10) Patent No.: US 10,444,392 B2
(45) Date of Patent: Oct. 15, 2019

(54) METHOD AND SYSTEM FOR DOWNHOLE OBJECT LOCATION AND ORIENTATION DETERMINATION

(71) Applicant: Silixa Ltd., Elstree Hertfordshire (GB)

(72) Inventors: Craig Milne, Elstree Hertfordshire (GB); Brian Frankey, Elstree Hertfordshire (GB); Tom Parker, Elstree Hertfordshire (GB); Mahmoud Farhadiroushan, Elstree Hertfordshire (GB)

(73) Assignee: SILIXA LTD., Hertfordshire (GB)

( * ) Notice: Subject to any disclaimer, the term of this patent is extended or adjusted under 35 U.S.C. 154(b) by 170 days.

(21) Appl. No.: 15/311,425

(22) PCT Filed: May 15, 2015

(86) PCT No.: PCT/GB2015/051448
§ 371 (c)(1),
(2) Date: Nov. 15, 2016

(87) PCT Pub. No.: WO2015/173592
PCT Pub. Date: Nov. 19, 2015

(65) Prior Publication Data
US 2017/0082766 A1 Mar. 23, 2017

Related U.S. Application Data

(60) Provisional application No. 61/994,474, filed on May 16, 2014.

(51) Int. Cl.
*G01V 1/00* (2006.01)
*G01V 1/46* (2006.01)
(Continued)

(52) U.S. Cl.
CPC .......... *G01V 1/46* (2013.01); *E21B 47/02208* (2013.01); *E21B 47/091* (2013.01);
(Continued)

(58) Field of Classification Search
CPC . G01V 1/46; G01V 1/226; G01V 1/44; G01V 11/002; E21B 47/02208; E21B 47/091; E21B 43/116; G01D 5/14
See application file for complete search history.

(56) References Cited

U.S. PATENT DOCUMENTS 2,674,049 A * 4/1954 James, Jr. ............... E21B 47/00
33/312
4,896,722 A * 1/1990 Upchurch ............... E21B 23/04
166/250.15
(Continued)

FOREIGN PATENT DOCUMENTS

WO WO-2013030555 A2 3/2013

OTHER PUBLICATIONS

The State Intellectual Property Office of China, First Notification of Office Action for CN Application No. 201580026239.9, dated Feb. 11, 2018.
(Continued)

*Primary Examiner* — Krystine E Breier
(74) *Attorney, Agent, or Firm* — Honigman LLP; Matthew H. Szalach; Jonathan P. O'Brien

(57) ABSTRACT

A downhole device is provided that is intended to be co-located with an optical fiber cable to be found, for example by being fixed together in the same clamp. The device has an accelerometer or other suitable orientation determining means that is able to determine its positional orientation, with respect to gravity. A vibrator or other sounder is provided, that outputs the positional orientation information as a suitable encoded and modulated acoustic
(Continued)

signal. A fiber optic distributed acoustic sensor deployed in the vicinity of the downhole device detects the acoustic signal and transmits it back to the surface, where it is demodulated and decoded to obtain the positional orientation information. Given that the device is co-located with the optical fiber the position of the fiber can then be inferred. As explained above, detecting the fiber position is important during perforation operations, so that the fiber is not inadvertently damaged.

17 Claims, 13 Drawing Sheets

(51) Int. Cl.
*E21B 47/022* (2012.01)
*G01V 1/44* (2006.01)
*G01V 11/00* (2006.01)
*E21B 47/09* (2012.01)
*G01D 5/14* (2006.01)
*G01V 1/22* (2006.01)
*E21B 43/116* (2006.01)

(52) U.S. Cl.
CPC .............. *G01D 5/14* (2013.01); *G01V 1/226* (2013.01); *G01V 1/44* (2013.01); *G01V 11/002* (2013.01); *E21B 43/116* (2013.01)

(56) References Cited

U.S. PATENT DOCUMENTS

| | | | | |
|---|---|---|---|---|
| 5,031,719 A * | 7/1991 | Baria | ...................... | G01V 1/52 181/102 |
| 5,904,210 A * | 5/1999 | Stump | ..................... | E21B 7/046 175/40 |
| 5,960,883 A * | 10/1999 | Tubel | .................... | E21B 34/066 166/313 |
| 6,871,410 B1 * | 3/2005 | Le Jeune | ............... | E21B 47/024 175/40 |
| 7,124,818 B2 * | 10/2006 | Berg | ..................... | E21B 17/1021 166/250.01 |
| 7,158,049 B2 * | 1/2007 | Hoefel | ..................... | H03C 5/00 340/854.3 |
| 7,331,409 B2 * | 2/2008 | Cole | ....................... | E21B 47/01 166/255.2 |
| 7,578,359 B2 | 8/2009 | Coates et al. | | |
| 8,861,307 B2 * | 10/2014 | Pabon | ..................... | G01V 1/52 181/104 |
| 8,953,412 B2 * | 2/2015 | Chen | ....................... | E21B 23/08 166/255.2 |
| 9,494,028 B2 * | 11/2016 | Johnson | .................... | E21B 4/02 |
| 2003/0011490 A1 | 1/2003 | Bailey | | |
| 2010/0039286 A1 * | 2/2010 | Robbins | ............... | G01V 11/002 340/855.3 |
| 2010/0175923 A1 * | 7/2010 | Allan | .................. | E21B 17/1064 175/45 |
| 2011/0277984 A1 * | 11/2011 | Woie | ....................... | E21B 49/10 166/66 |
| 2012/0022825 A1 * | 1/2012 | Wootten | ................. | G01V 11/00 702/150 |
| 2012/0126992 A1 | 5/2012 | Rodney et al. | | |
| 2014/0053750 A1 * | 2/2014 | Lownds | .................. | F42C 11/06 102/313 |
| 2014/0333310 A1 * | 11/2014 | Lozinsky | ................. | G01B 7/14 324/346 |
| 2016/0241053 A1 * | 8/2016 | Erdos | .................. | H01M 10/425 |

OTHER PUBLICATIONS

International Searching Authority, International Search Report and Written Opinion for PCT Application No. PCT/GB2015/051448, dated Sep. 18, 2015.

* cited by examiner

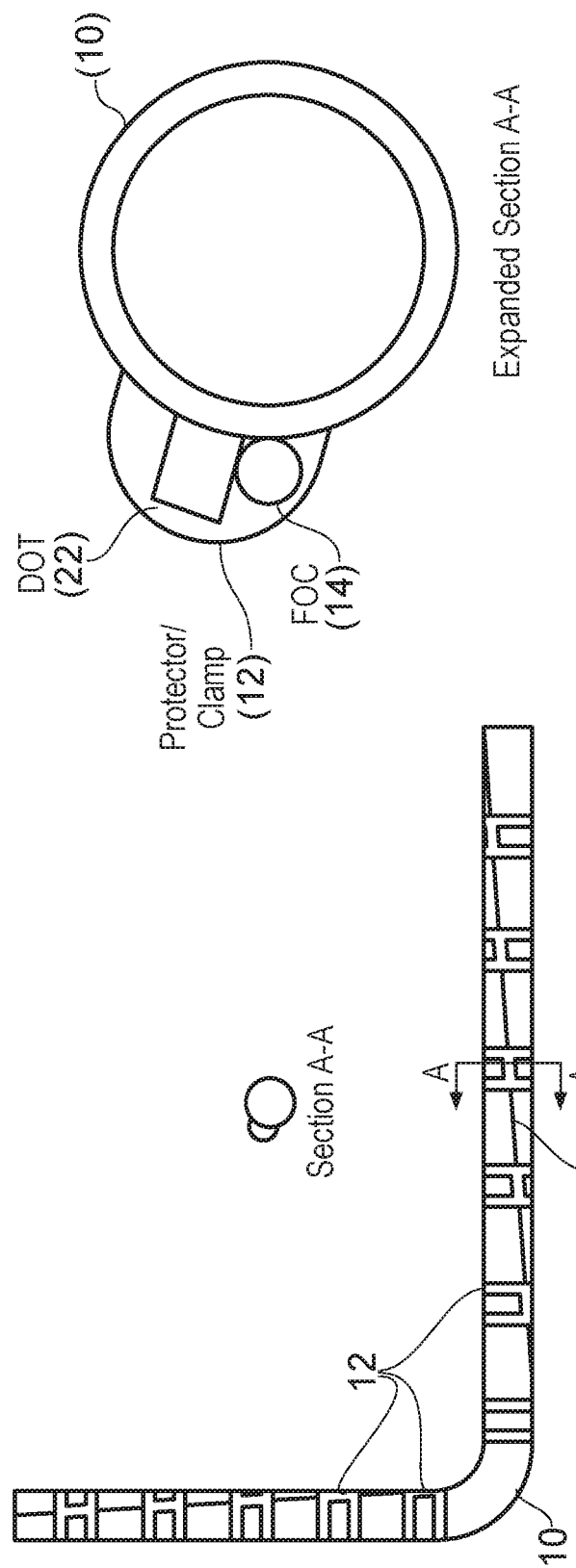

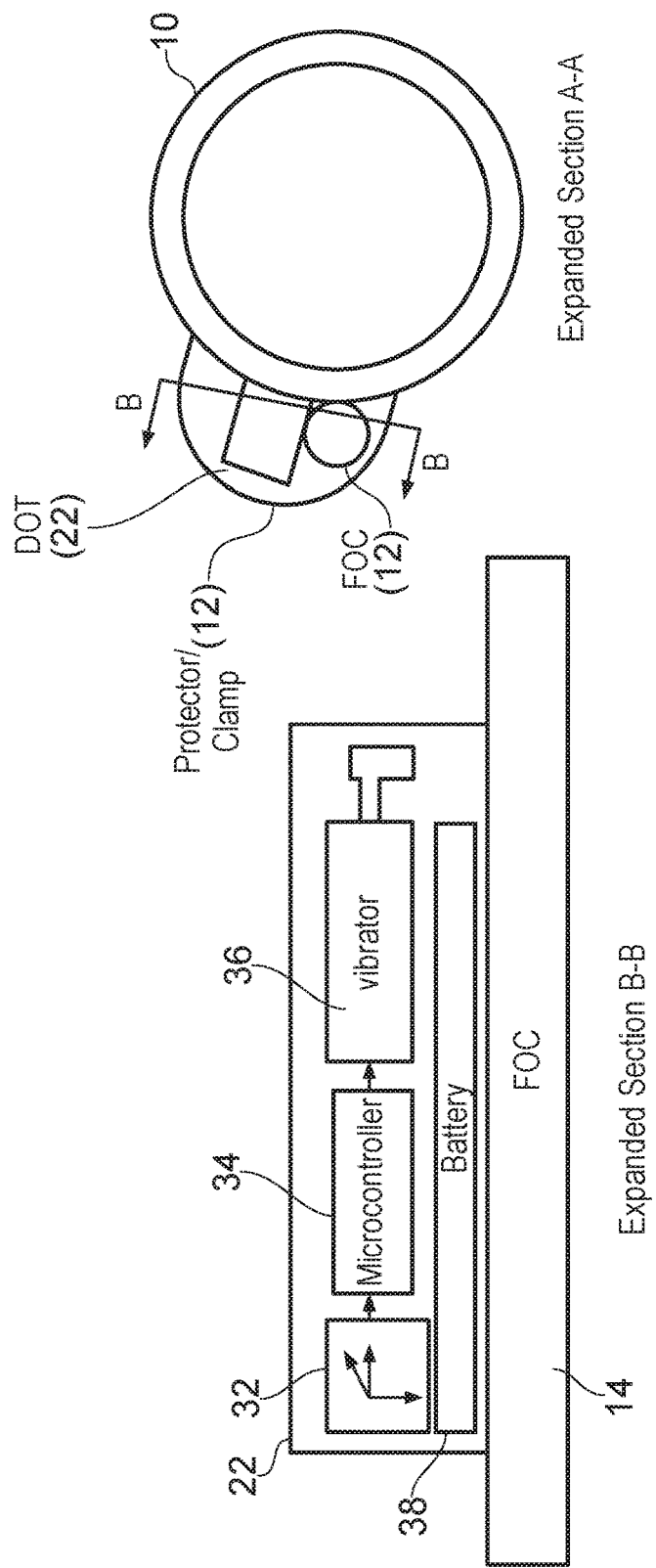

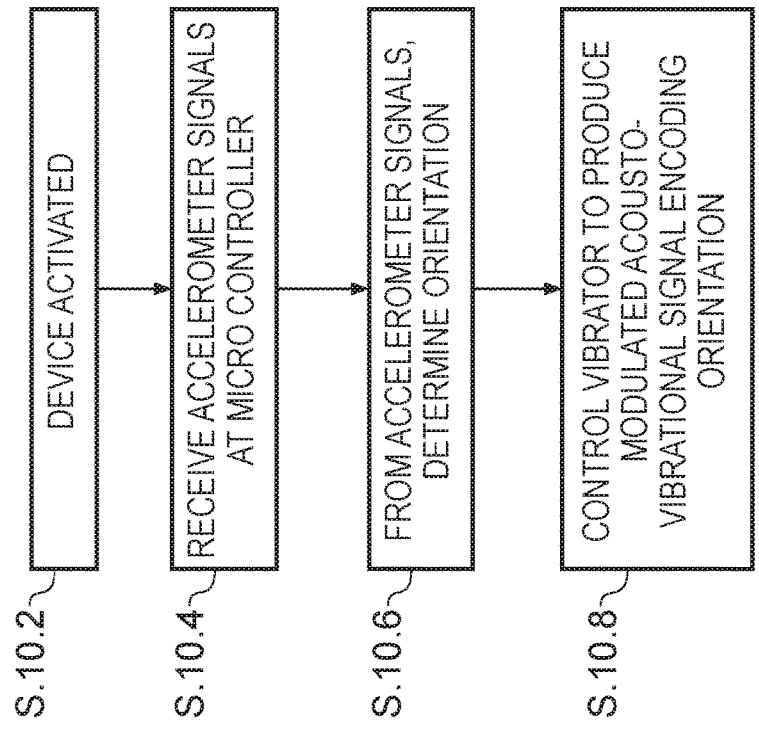
FIG. 10
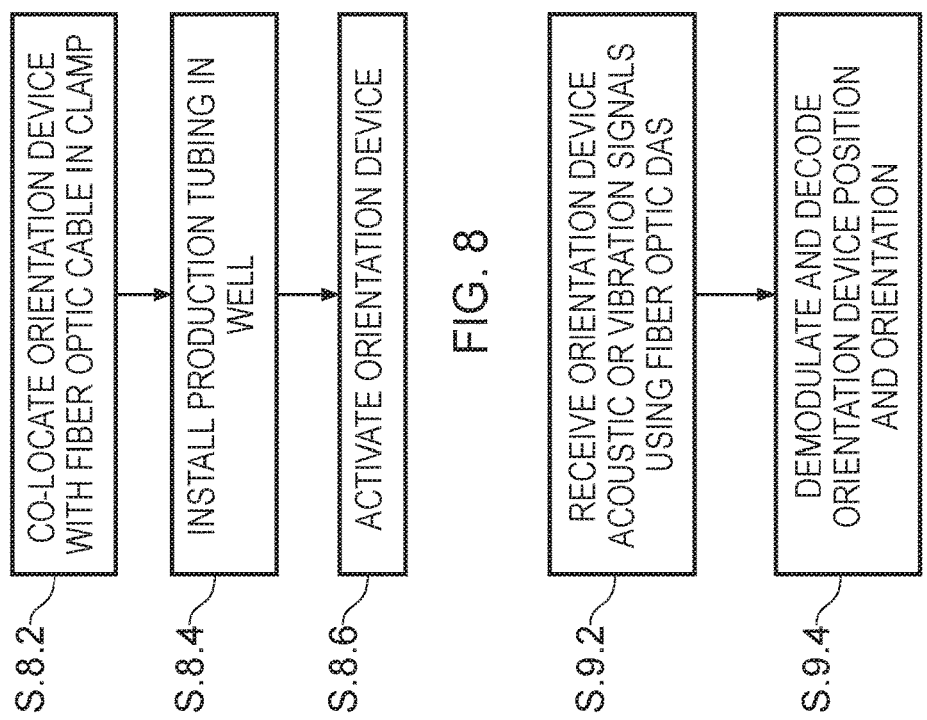
FIG. 8
FIG. 9

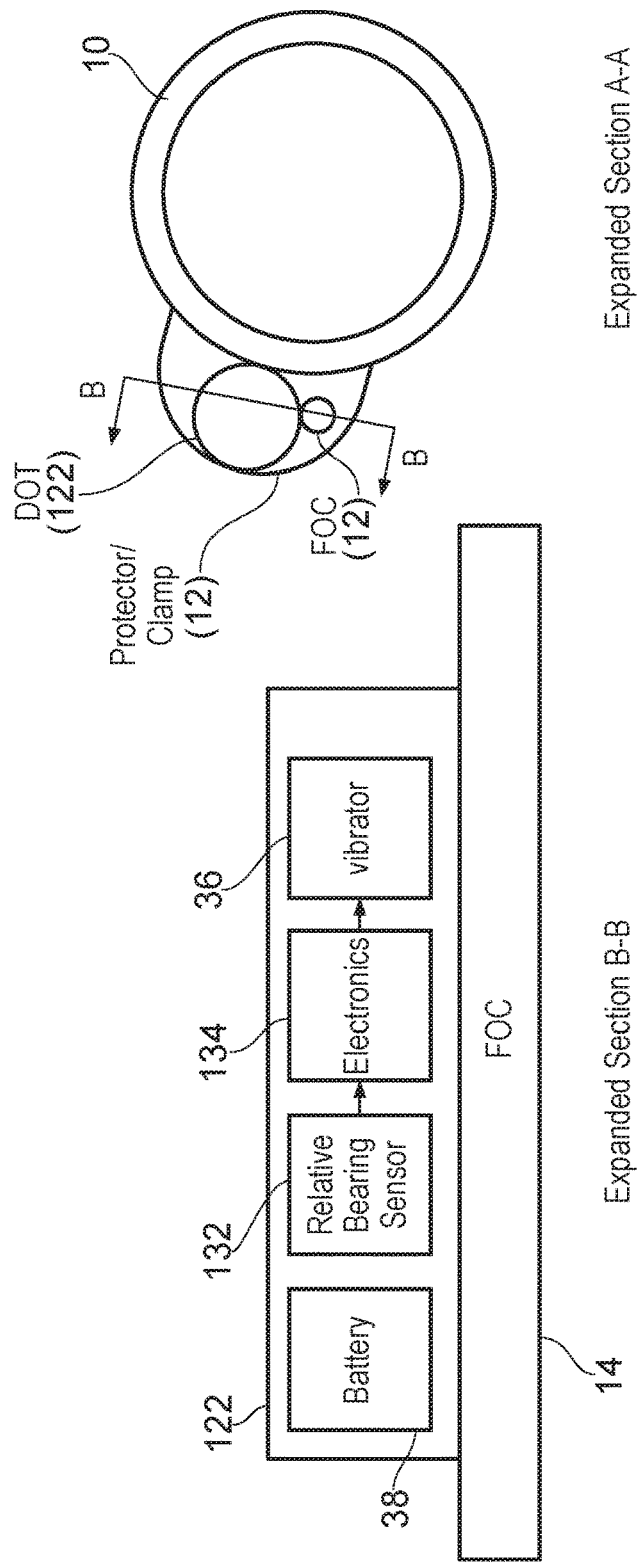

172 – Stainless Steel Tube
174 – Stainless Steel Cap
176 – Laser Weld Orbital, Full Penetration 182 – Solenoid Housing
184 – Battery Housing
186 – Spinner Housing
188 – Plastic Cap

METHOD AND SYSTEM FOR DOWNHOLE OBJECT LOCATION AND ORIENTATION DETERMINATION

CROSS-REFERENCE TO RELATED APPLICATIONS

This application claims priority under 35 U.S.C. § 371 to Patent Cooperation Treaty Application No. PCT/GB2015/051448, filed May 15, 2015, which claims priority to U.S. Provisional Application No. 61/994,474, filed May 16, 2014, the entire contents of which are incorporated herein by reference.

TECHNICAL FIELD

The present invention provides a method and system for determining the orientation and/or location of a downhole object, and in particular for example an object such as an optical fiber cable that is located on the exterior surface of production tubing and held on by a clamp. Particular embodiments provide for a co-located device with the optical fiber that is able to determine its own orientation and communicate the determined orientation back to the surface.

BACKGROUND TO THE INVENTION AND PRIOR ART

To detect an acoustic signal downhole, distributed acoustic sensing (DAS) is commonly and effectively used. This method employs fibre optic cables to provide distributed acoustic sensing whereby the fibre optic cable acts as a string of discrete acoustic sensors, and an optoelectronic device measures and processes the returning signal. The operation of such a device is described next.

A pulse of light is sent into the optical fibre, and a small amount of light is naturally back scattered, along the length of the fibre by Rayleigh, Brillouin and Raman scattering mechanisms. The scattered light is captured by the fibre and carried back towards the source where the returning signal is measured against time, allowing measurements in the amplitude, frequency and phase of the scattered light to be determined. If an acoustic wave is incident upon the cable, the glass structure of the optical fibre is caused to contract and expand within the vibro-acoustic field, consequently varying the optical path lengths between the back scattered and/or reflected light scattered from different locations along the fibre The returning signal can be processed in order to measure the acoustical and/or vibrational field(s) at all points along the structure.

In known distributed acoustic sensing systems (DAS), standard fibre optic cables are utilised to obtain a measurement profile from along the entire length of the fibre at intervals ranging from 1-10 meters. Further details regarding the operation of a suitable DAS system, such as the iDAS™, available from Silixa Limited, of Elstree, UK are given in WO2010/0136809. Systems such as these are able to digitally record acoustic fields at every interval location along an optical fibre at frequencies up to 100 kHz. Since the location of the acoustic sensors is known (the fibre deployment being known), the position of any acoustic signal can be thus identified by means of time-of-arrival calculations.

DAS systems find lots of applications in the oil and gas industry, and optical fibers that can be connected to DAS systems, amongst other things, are often installed within wellbores, usually as a metal cable running parallel with the well bore casing clamped to the outside thereof. In a typical oil or gas well, once the well bore has been drilled and the casing installed, cement is used to fill the well bore external of the casing. However, as part of the "completion" process of the well, the casing and cement is perforated within the hydrocarbon bearing regions, to allow hydrocarbons to flow into the casing for extraction. Perforation is typically performed by a perforating gun, which is typically a cylindrical metal tube provided with shaped explosive charges arranged around the circumference thereof. The perforating gun is lowered through the casing to the intended production zone, and the shaped charges are detonated, with the intention of blasting holes through the casing and cement of the well, and into the surrounding rock strata, to allow hydrocarbons to then flow through the created channels into the casing for extraction. Similarly, where a fracturing fluid is to be pumped into the well to fracture the rock strata, the created holes provide routes for the fracturing fluid to exit the well into the surrounding rock.

FIG. 11 illustrates the use of a perforating gun to generate perforations in a well bore casing and cement, and into the surrounding rock strata. Perforating gun 10 comprises a metal cylinder provided with shaped explosive charges arranged around the outer surface thereof. For example, the shaped charges may be provided in lines every 120 degrees around the outer circumference of the gun. The gun is provided with a communications line 12 to the surface for control purposes, to allow the explosive charges to be detonated on command. In use as noted above the gun is lowered to the intended production zone, and the shaped charges detonated to blast through the casing and cement (as shown in FIG. 11(b)), to create production channels in the surrounding rock strata through which oil or gas can flow to enter the well bore (as shown in FIG. 11 (c)).

One issue with the use of perforating guns is to try and prevent the shaped charges from damaging any control or sensing cabling or other lines that may extend along the wellbore external of the casing. For example, optical fibers are commonly installed along the external surface of the casing within the wellbore, either for sensing purposes and/or for control of downhole tools. Care must be taken when using a perforating gun that the shaped charges are not pointed at the external cabling or other lines such that the charges when detonated would sever such lines. As the perforating is performed as part of the well completion, by that point the fibers have typically already been cemented into the well bore, and hence repair can be very costly, or even impossible. To try and prevent such damage occurring, conventionally the fibers and other signalling lines are located between two metal rods or cables, and a magnetometer is provided on the perforating gun to try and detect the metal rods. That is, the rotational orientation of the perforating gun is altered within the casing whilst the magnetometer is used to detect the location of the metal rods either side of the fibers or other cabling. Once the metal rods have been detected, the orientation of the perforating gun can be controlled to ensure that the shaped charges are pointed away from the area of the metal rods, and hence the cabling or other lines to be protected.

One problem with the above arrangement is one of cost, in that the metal rods are usually required to extend along a significant length of the well bore, hence increasing the material and production cost of the well. In addition, the use of magnetometers to detect the rods is not particularly accurate, and particularly in some rock formations or in some regions where magnetic anomalies can occur that interfere with the operation of the magnetometers. Moreover, the presence of the casing and other downhole equipment can interfere with the proper operation of the magnetometers, meaning that it is not reliably possible to rotationally orient the perforating gun within the casing to ensure that the sensor and control lines and/or other cabling will not be damaged by the use of the perforating gun. In addition, the rods also form a potential leakage path up the outside of the casing.

In order to address this problem WO2013/030555 describes a method and apparatus for determining the relative orientation of objects downhole, and especially to determining perforator orientation. The method, illustrated in FIG. 12, involves varying the orientation of an object, such as a perforator gun (302) in the wellbore and activating at least one directional acoustic source (402*a*-*c*). Each directional acoustic source is fixed in a predetermined location to the object and transmits an acoustic signal preferentially in a known direction. The directional acoustic source(s) is/are activated so as to generate sound in a plurality of different orientations of said object. An optical fiber (104) deployed down the wellbore is interrogated to provide distributed acoustic sensing in the vicinity of the object and the acoustic signals detected by the optical fiber are analyzed so as to determine the orientation of the at least one directional acoustic source relative to the optical fiber, for instance by looking at the relative intensity in the different orientations. Further details of the operation of the arrangement are described in the document, any and all of which necessary for understanding the present invention being incorporated herein by reference.

Therefore, whilst the arrangement in WO2013/030555 apparently should overcome the cost and inaccuracy of the prior art magnetometer arrangements, the arrangement relies on the operation of a DAS system to detect the directional acoustic sources, with the directional acoustic sources being described as conventional loudspeakers arranged to project sounds forward and located in a casing that absorbs sound emitted in other directions. Conventional loudspeakers typically operate within audible frequency bands, for example in the range 20 Hz to 20 kHz, and a typical DAS of the prior art is usually capable of detecting sound at these frequencies with good spatial resolution. However, the directionality of conventional loudspeakers, even provided in an otherwise insulating casing, is not high, and −3 dB directivity arcs of +/−50 to 60° can be common. FIG. 12 has been annotated to show typical example-directivity arcs for the three loudspeakers. As shown, such directivity often means that even if the speaker is pointed away from the optical fibre, the fiber may still pick up a large signal from the speaker. Allowing further for echoes and other multi-path effects within the casing, and the reliability of such a system begins to deteriorate. Basically, using conventional speakers as described in the prior art does not give a high enough directivity for the sound emitted to reliably determine the orientation of the perforating gun.

SUMMARY OF THE INVENTION

Embodiments of the invention provide a downhole device that is intended to be co-located with an optical fiber, the location of which is to be found, for example by being fixed together in the same clamp. The device has an accelerometer or other suitable orientation determining means that is able to determine its positional orientation, with respect to gravity. A vibrator or other sounder is provided, that outputs the positional orientation information as a suitably encoded and modulated acoustic signal. A fiber optic distributed acoustic sensor deployed in the vicinity of the downhole device detects the acoustic signal and transmits it back to the surface, where it is demodulated and decoded to obtain the positional orientation information. Given that the device is co-located with the optical fiber the position of the fiber can then be inferred. As explained above, detecting the fiber position is important during perforation operations, so that the fiber is not inadvertently damaged.

Other embodiments also provide the more general concept of having remote sensing devices deployed in an environment to be sensed and that sense local conditions and/or stimuli with appropriate sensors, and that then produce modulated vibro-acoustic signals encoding the sensed local conditions and/or stimuli. The vibro-acoustic signals are then detected by the optical fiber of an optical fiber distributed acoustic sensor system, the fiber being deployed into the environment to be sensed. The incident vibro-acoustic signals on the fiber in turn modulate backscatter and/or reflected optical signals that propagate back along the fiber, and which are then detected at a DAS processing box to which the fiber is connected to allow the vibro acoustic signals to be sensed. Subsequent demodulation and decoding of the sensed vibro-acoustic signals allows the local condition and/or stimuli information to then be re-obtained. In this way, the DAS system and its optical sensing fiber are being used as a return communications channel for sensor information from the remote devices.

From one aspect there is provided an apparatus, comprising: i) an orientation detector arranged to detect the orientation of the apparatus; and ii) a vibrational or acoustic source arranged to produce vibrational or acoustic signals in dependence on the detected orientation of the apparatus, the produced vibrational or acoustic signals representing the detected orientation.

With such an arrangement an apparatus is provided that may be used downhole to determine orientation of downhole elements, such as a clamp fastening an optical fiber to production tubing.

In one embodiment the orientation detector is a relative bearing sensor based on a magnetic encoder with eccentric weight sensitive to gravity when placed off the vertical plane. In some embodiments the relative bearing sensor detects the orientation of the apparatus with respect to the direction of gravity.

In another embodiment the orientation detector is a three-axis accelerometer that preferably detects the orientation of the apparatus with respect to gravity.

In a further embodiment the orientation detector comprises one or more offset rotatably mounted magnetic masses, and a magnetic detector arranged to detect the rotational orientation of the offset magnetic masses. Such an arrangement has advantages in terms of robustness and guaranteed operation.

In a yet further embodiment the orientation detector may be a relative bearing sensor.

In one embodiment the vibrational or acoustic source is arranged to generate a modulated vibrational or acoustic signal that encodes information pertaining to the detected orientation. In this way, information can be transmitted vibro-acoustically from the downhole device.

In one particular embodiment the vibrational or acoustic signal is frequency modulated whereby to encode the information pertaining to the detected orientation. In this respect, frequency modulated signals are easier for a DAS detector to discriminate.

In one embodiment the frequency modulation comprises selection of one or a set of predetermined modulation frequencies corresponding to respective predetermined orientations. In particular, the set of predetermined modulation frequencies may be selected such that no member of the set is a harmonic frequency of any other member of the set. In this way, discrimination between frequencies and accurate communication of information is established.

In one embodiment the vibrational or acoustic source is an impulse source that generates vibrational or acoustic impulses at one or more frequencies corresponding to respective one or more detected orientations. Again, such a signal is relatively easy for a DAS to detect and discriminate. In some such embodiments, the impulse source is an electro-mechanical tapper, such as for example, a solenoid driven device, or a piezo-electric driven device. As a consequence, tapping signals of controllable frequency that are easy for the DAS to detect can be generated.

In one embodiment the apparatus is provided within a sealed case within which the orientation detector and the vibrational and/or acoustic source are contained. Such an arrangement helps to protect the apparatus from environmental conditions encountered downhole.

In one embodiment the apparatus further includes initiation circuitry, arranged to detect an external initiation condition that indicates that the orientation detector and vibrational and/or acoustic source should begin to operate, the apparatus remaining quiescent until such condition is detected. Thus feature helps to save battery life to those periods until after actual installation of the device downhole and final placement of the production tubing, whilst maintaining the external integrity of the case.

In the above embodiment the external initiation condition is one or more of: i) a magnetic field of at least a predefined activation value; ii) an electronic time delay of predetermined duration; iii) an acceleration or shock of at least a minimum predefined activation value; or iv) a temperature of at least a minimum predefined activation value; wherein the predefined activation values are greater than typical ambient values.

Furthermore, in a two-way communication arrangement, the downhole device can also receive vibro-acoustic signals and so that it can be activated and operated remotely. In this case the downhole device can be turned on, send back the information and then go back to a standby condition with a low power requirement. This can extend the operating life of the device.

In one embodiment there is further provided a clamp for clamping optical fiber to tubing or casing, the orientation detector and the vibrational and/or acoustic source being co-located within the clamp with the optical fiber.

Another aspect of the invention provides a distributed acoustic sensor system, comprising an optical fiber deployed along a well bore and a signal processing apparatus arranged to receive optical backscatter and/or reflections from along the optical fiber and to process such backscatter and/or reflections to determine vibrational and/or acoustic signals incident on the optical fiber, the optical fiber being collocated at one or more positions along the well bore with an apparatus according to the first aspect above, vibrational or acoustic signals from said apparatus being detected by said distributed acoustic sensor system and processed to thereby determine the orientation of the apparatus.

A further aspect also provides a well or borehole arrangement, comprising production tubing having a plurality of clamps affixing one or more optical fibers to the surface thereof, one or more of said clamps containing an apparatus according to the first aspect above.

A still yet further aspect provides a system, comprising: i) a downhole or remote device, provided with at least one vibrational transducer and arranged to listen for vibro-acoustic or seismic signals pertaining to the downhole or remote device, and to produce vibro-acoustic signals pertaining to the downhole or remote device; ii) a fiber optic distributed acoustic sensor system, comprising an optical fiber deployed downhole or into a sensing environment from a local position and arranged to listen for the vibro-acoustic signals produced by the downhole or remote device; and iii) a transducer arranged to transmit vibro-acoustic or seismic signals into the ground or into the sensing environment; wherein the fiber optic distributed acoustic sensor system communicates information from the downhole device to the surface by listening for the vibro-acoustic signals produced by the downhole device, and the transducer communicates information to the downhole or remote device. With such an arrangement a "closed-loop" communications system is provided between the local position and the downhole or remote devices, using the fiber optic DAS as the return channel to the surface.

In further embodiments, the downhole device may also be equipped with one or more further sensors, such as a pressure sensor, temperature sensor, chemical sensor, or gravity, to measure properties of its surroundings along the well bore or in the reservoir. The measurements may then be communicated by a suitably encoded vibro-acoustic signal output by a vibro-acoustic transducer on the device, such as a speaker or other sounder.

An array processing of the distributed acoustic data may be used to improve the localisation of the device as well as improving the vibro-acoustic sensitivity.

The embodiment may also be applied for remote sensing and communications for inland as well as for subsea. For example, as described further below, the optical fiber DAS may be used as a return communications channel for any remote sensing devices deployed within a sensing environment, which need not be a subterranean environment, but can be any environment into which an optical fiber can be deployed, and which supports the propagation of vibro-acoustic energy. Generally, the remote sensing devices sense local conditions and/or stimulil within their local part of the sensing environment, and then generate a vibro-acoustic signal encoding the sensed local conditions and/or stimuli. The vibro-acoustic signal is then detected by the optical fiber of the DAS, which communicates it back to the locality of the DAS processor. As noted, therefore, the optical fiber DAS acts as a communications channel to communicate sensor information from the remote devices back out of the sensing environment.

In addition, a forward channel may also be provided, to allow communications with the remote devices. If the remote devices are deployed underground, this forward channel might for example use a seismic transducer or other vibrational device to generate modulated vibrations to be transmit through the ground to the devices. Where the devices are above ground, appropriate radio channels may be used. Where the devices are subsea, acoustic based channels, such as sonar type channels, may be used.

Further features and aspects of the invention will be apparent from the appended claims.

BRIEF DESCRIPTION OF DRAWINGS

Embodiments of the present invention, presented by way of example only, will now be described, with reference to the accompanying drawings, wherein like reference numerals refer to like parts, and wherein:

FIG. 1 is a diagram illustrating tubing having a fiber on the outside thereof held in place by clamps;

FIG. 2 is a cross-section of part of FIG. 1;

FIG. 3 is a block diagram of the components of an apparatus according to an embodiment of the invention;

FIG. 4 is a cross section of a part of FIG. 1;

FIG. 8 is flow diagram of a first process used in an embodiment of the invention;

FIG. 9 is flow diagram of a second process used in an embodiment of the invention;

FIG. 10 is flow diagram of a third process used in an embodiment of the invention;

FIG. 13 is a block diagram of components of an apparatus according to a second embodiment of the invention;

FIG. 14 is a cross-section of the apparatus of FIG. 13;

DETAILED DESCRIPTION OF PREFERRED EMBODIMENTS

Figure 6:
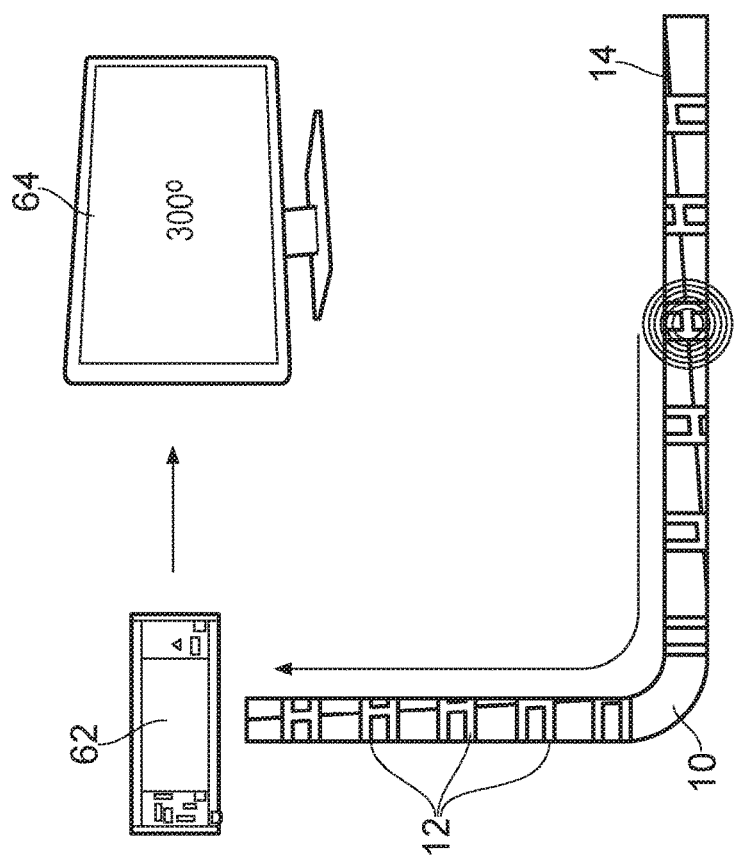
FIG. 6 is a diagram illustrating the operation of an embodiment of the invention.

A brief overview of embodiments of the invention will first be given, followed by a detailed description of particular embodiments.

Fiber optic cables (FOC) installed on the outside of completion casing are at risk of being damaged during the perforation of the casing. To avoid damaging the FOC the perforation charges are azimuthally oriented away from the FOC. The azimuthal orientation of the FOC must be determined after installation of the FOC is complete. Traditional methods for determining the orientation of the FOC utilize instruments inside of the casing, typically conveyed on wireline, which detect the presence of the FOC on the outside of the casing using electromagnetic or ultrasonic measurements. To improve the reliability of detection using that method, wire rope, or other metallic mass, is installed parallel and adjacent to the FOC to increase the amount of metal mass to be detected at a minimum length equal to the interval to be perforated. This method for determining the orientation of the FOC falls short of the required reliability and increases the risk of monetary loss and loss of control during the life of the well. To improve reliability and reduce risk we have conceived a downhole orientation tool (referred to herein as DOT) that will eliminated the need to install wire rope and eliminate the need for wireline runs to determine the orientation of the FOC.

The downhole orientation tool (DOT) measures its orientation relative to gravity and transmits the orientation information through an acoustic or mechanical strain signal. The DOT can be installed with a known relative position to other downhole elements and can be used to infer the orientation of those elements. The downhole orientation tool utilizes a set of accelerometers (for example a three axis accelerometer) to measure the orientation of gravity relative to the tool. The accelerometer data is then transformed to an acoustic or mechanical strain signal using a mechanical or electromechanical device such as but not limited to a solenoid, piezoelectric material, speaker, or vibrator. The acoustic signal is detected by the FOC which is connected to a distributed acoustic sensor (DAS) system. The acoustic signal measured by the DAS system is read at the surface and transformed back into the accelerometer data. The accelerometer data gives the orientation of the DOT relative to gravity.

The acoustic-mechanical signal generator can take many forms to optimize the signal for detection by the fiber.

In one embodiment, the following steps are performed:
1. Accelerometer measures gravity
2. Microcontroller receive signal from accelerometer
3. Microcontroller converts signal to orientation and translates orientation to an output signal sent to vibrator
4. Vibrator generates mechanical signal
5. DOT Vibrates at specific frequency or interval. The frequency or interval is dependent on the orientation
6. Fiber optic control line is vibrated by vibrator
7. DAS surface interrogator measures vibration
8. Vibration translated back to orientation In more detail, the DOT is a solution that knows the side of the pipe it is on using a sensor that is sensitive to gravity. Since the tool is sensitive to gravity it will know if it is right-side-up or upside-down and all positions in-between. For example, if it is upside down then we know it is on the bottom side of the casing. The tool will be installed next to the fiber such that a user can infer which side of the casing the fiber is on from knowing which side of the casing the DOT is on. Then the user informs the driller which side of the casing the fiber is on at the interval to be perforated and they configure the perforation guns to orient the blasts away from the side of casing that the fiber is on.

Such a device will work in all situations apart from vertical well sections, where there is no high side of the casing.

As mentioned, the tool will detect the angle of its reference side relative to the high side of a deviated well. This measurement is then converted into a modulated acoustic signal that indicates the angular position of the cable at each cable clamp relative to the high side of the borehole. The cable clamps are positioned at the tubing connections.

A DAS system (such as the Silixa® iDAS™) detects the individual signals from each cable clamp position and dedicated software decodes and plots the measurement to indicate the relative bearing of the fibre optic cable at each clamp. The relative bearing would typically refer to the angle relative to the high side of the hole.

To summarize the intended use of the DOT devices, therefore:
1) During installation of an optical fibre cable the DOT device will be co-located with the cable under each cable clamp along the length of the production interval where planned or future perforations may be introduced.
2) Once the production tubing is landed and is in its resting orientation the devices will talk to the DAS with individual cable orientations at each position.

3) The cable orientation will then be plotted versus depth with a spatial resolution to match the spacing of the devices. Expected to be at each cable clamp (~40 feet).

4) The perforating company will then configure a passive orientation string to be directed away from the cable at the desired depth interval. This is done using eccentric weights where gravity forces them to the low side of the hole.

Communication between the DOT device and the DAS can be coded to give each DOT device a unique code and it is possible this communication could be two-way i.e. a tool could be used to wake the DOT devices or their messages could be timed so that no intervention is needed once they are installed.

Should all else fail then the DOT devices would act as additional masses that could be used in the prior art methods for locating a FOC downhole.

If the oriented downhole devices are powered (e.g. not necessarily sacrificial and battery operated, but instead all connected to a power source) they may also be used for repeat perforating in the future and could be used as a noise source in wells where the flow is quiet as described in our prior unpublished co-pending International Patent Application No. PCT/GB2013/052875, the entire contents of which necessary for understanding this aspect being incorporated herein by reference.

For example, a DOT device may also have batteries and charging circuitry to allow for that inductive charging. In this case a hybrid fiber optic/electric cable may be installed in place of the fiber optic cable, which interacts with the charging circuitry to inductively charge the batteries. Such an arrangement would be feasible for a large number of wells, although may be less effective in high temperature downhole environments.

As mentioned, the DAS system may be a Silixa® iDAS™ system, the details of operation of which are available at the URL http://www.silixa.com/teclnology/idas/, and which is also described in our earlier patent application WO2010/0136809, any details of which that are necessary for understanding the present invention being incorporated herein by reference.

A more detailed embodiment of the invention will now be described with reference to FIGS. 1 to 10.

FIG. 1 illustrates an example section of well casing 10, having an optical fiber 14 running along the exterior surface thereof. The optical fiber 14 is held in place by a plurality of mechanical clamps 12 that extend around the casing 10 to hold the fiber optic cable 14 against the casing 10. The cable clamps may be separated from each other by up to several meters, for example they may be approximately 3 to 15 meters apart.

FIG. 2 is a section along the line A-A of FIG. 1, which illustrates the internal contents of a clamp body 12. In particular, from FIG. 2 it can be seen that a clamp 12, attached to the side of casing 10, contains fiber optical cable 14, as well as the downhole orientation tool device 22, which is co-located next to the fiber optic cable 14 within the clamp body 12. By co-locating the downhole orientation tool 22 with the fiber optic cable, then any orientation that is determined for the downhole orientation tool 22 should also substantially correspond to the fiber optical cable.

FIG. 4 reproduces FIG. 2, but shows an expanded section along the line B-B, that is shown in FIG. 3. From FIG. 3 it can be seen that the downhole orientation tool device 22 comprises an outer casing, within which is contained a three axis accelerometer 32, which is arranged to communicate with a micro controller 34. The micro controller 34 receives signals from the three axis accelerometer, and determines the orientation of the downhole orientation tool with respect to gravity, in a manner to be described. Having determined the orientation with respect to gravity, the micro controller 34 then controls a vibrator 36, to vibrate in a specific pattern in order to communicate the determined orientation. That is, the vibrator 36 produces a modulated vibro-acoustic signal that encodes the determined orientation, as determined by the micro controller. The components of the downhole orientation tool 22 are powered by a battery 38.

In use the downhole orientation tool 22 is co-located substantially contiguously with the fiber optic cable 14, for two reasons. The first is such that the orientation that the downhole orientation tool is able to determine for itself should also then substantially correspond to the orientation for the fiber optic cable, and hence the position of the fiber optic cable around the casing can then be inferred. Additionally, when the fiber optic cable is connected up to a distributed acoustic sensor (DAS), the DAS system can then be used to detect the vibro-acoustic signal generated by the vibrator 36, which vibro-acoustic field is then detected by the DAS system via back scatter from along the fiber optic cable 14. The encoded and modulated orientation information can thus be obtained, and then subsequently demodulated and decoded to give the orientation information of the downhole orientation tool 22.

Of course, in some embodiments the downhole orientation tool 22 and the fiber optic cable 14 need not be actually touching, although there should be a good vibro-acoustically conductive connection therebetween. This can be achieved by mounting the fiber optic cable and the downhole orientation tool within the same rigid clamp structure.

Figure 5:
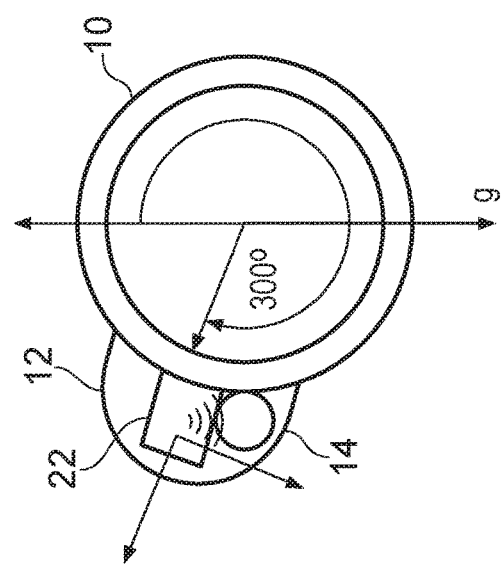
FIG. 5 is the cross section of FIGS. 2 and 4, annotated to show orientation detection.

FIGS. 5 and 6 illustrate the arrangements in operation. In FIG. 6 a distributed acoustic sensor box 62 is provided which is connected to the fiber optic cable 14, and receives back scatter signals from there-along, as known in the art. From the back scatter signals the distributed acoustic sensor is able to determine the vibro-acoustic field at various resolutions along the fiber, typically from one meters to five meters resolution. The distributed acoustic sensor 62 is able to output its results via a screen 64.

FIG. 5 illustrates an example of the DOT in operation. Here the DOT 22 is co-located with the fiber optic cable 14 within the clamp 12, and is located at an angle of approximately 300 degrees from the vertical orientation, as measured clockwise. In this respect, the vertical orientation can be determined as being the opposite of the gravitational direction determined by the three axis accelerometer in the DOT 22. Therefore, briefly, the three axis accelerometer 32 determines the 300 degree orientation, and passes this information to the micro controller 34. The micro controller 34 encodes the orientation information (for example, using ASCII encoding or the like) into a suitable control signal which is then used to modulate the output of the vibro-acoustic vibrator 36. Various acoustic modulation schemes are known in the art, such as the well-known pulse width modulation schemes used to record data onto magnetic tapes. Alternatively, various frequency modulation schemes, such as, for example, DTMF related schemes may also be used.

The vibro-acoustic vibrations produced by the vibrator 36 are felt by the fiber optic cable 14, causing back scatter from the section of cable adjacent to the downhole orientation tool 22, which back scatter can then be detected by the distributed acoustic sensor box 62, the modulated acoustic signal from the vibrator 36 being determined therefrom. The modulated acoustic signal is then demodulated to retrieve the encoded orientation information. The encoded orientation information may then be decoded, and the decoded orientation information then output on the screen 64, as shown.

Figure 7:
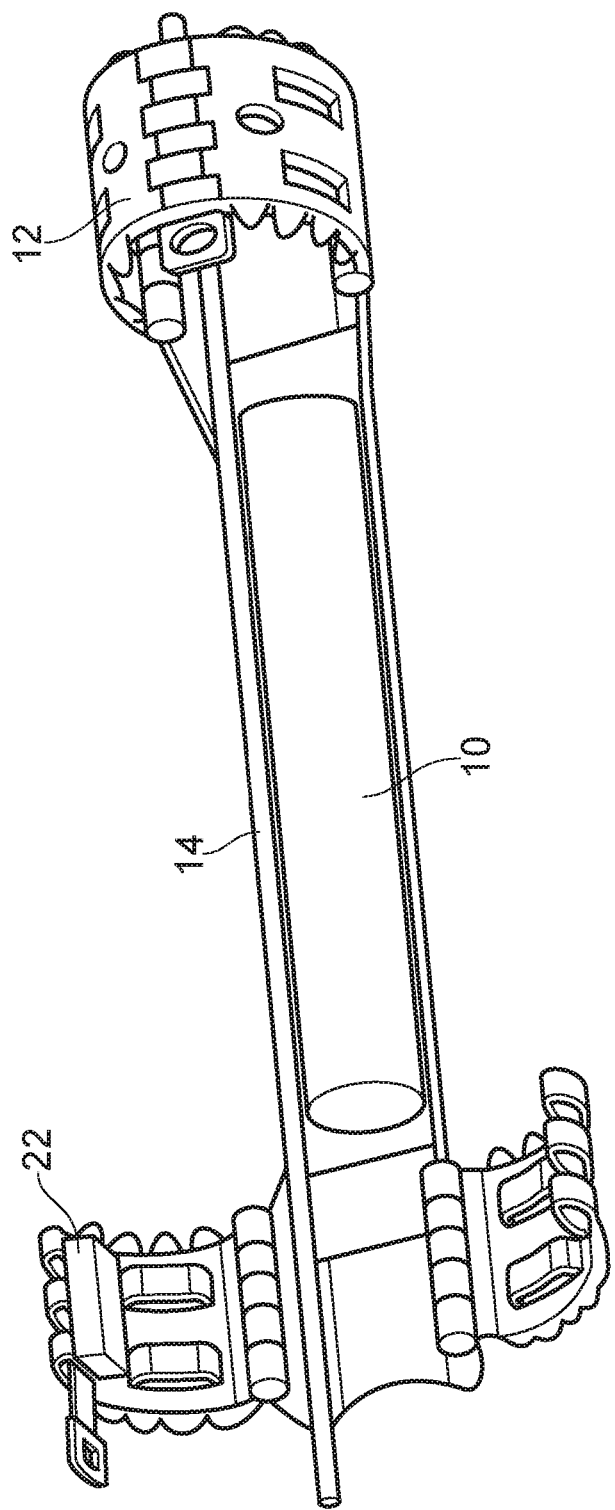
FIG. 7 is an illustration of a clamp used in an embodiment of the invention.
Figure 11:
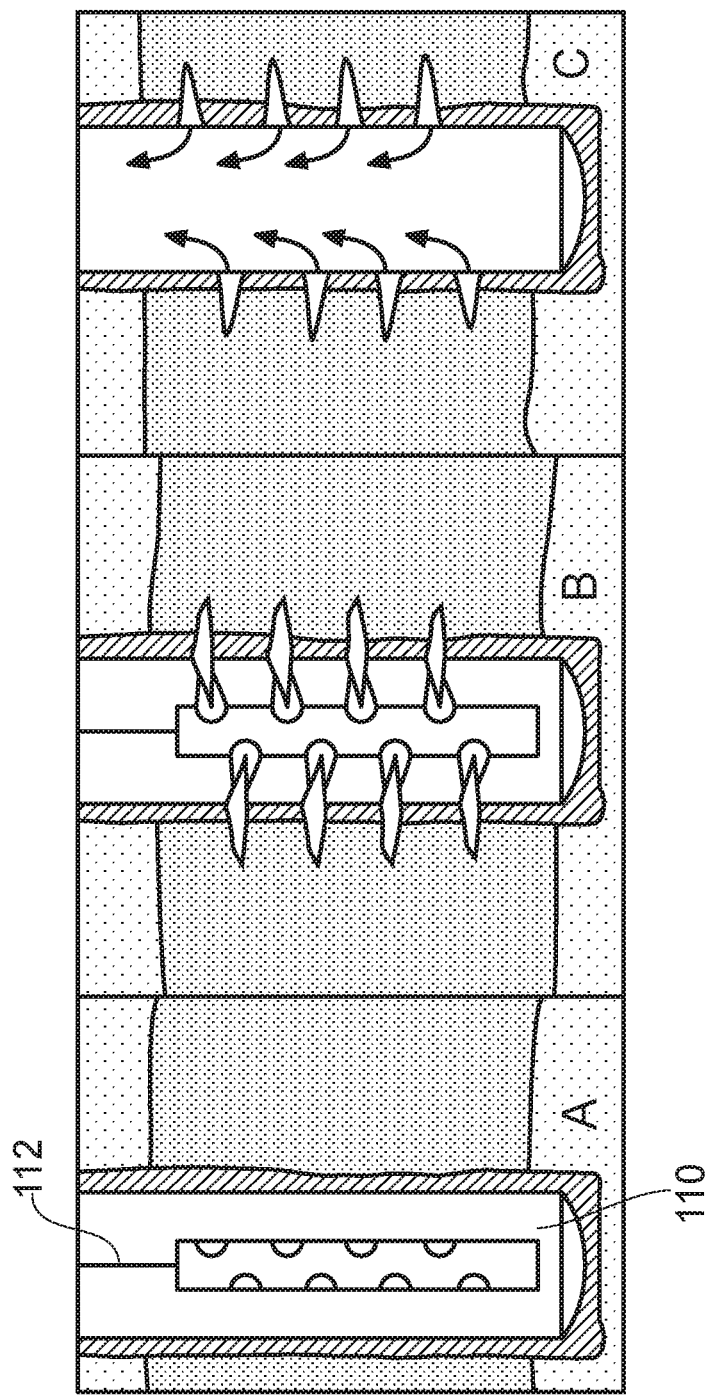
FIGS. 11 and 12 are diagrams of aspects of the prior art.
Figure 12:
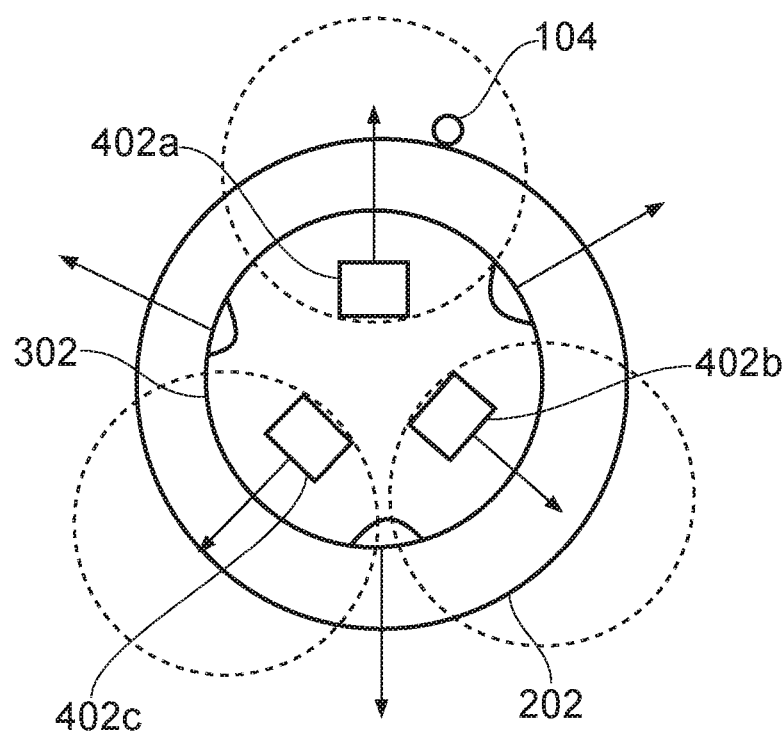

FIG. 7 illustrates an example clamp 12, arranged around a section of casing 10, which has a fiber optic cable 14 running there-along. In this case the clamp 12 has two closing sections, and located underneath one of these closing sections is the downhole orientation tool 22, attached to the underside of one of the closing sections. When the closing sections are closed, the downhole orientation tool 22 is then brought and held against the optical fiber 14. In this way, the clamp 12 holds the downhole orientation tool device 22 against or near to the fiber optic cable 14, such that there is a good vibrational connection therebetween.

FIGS. 8, 9 and 10 illustrate the method of operation of the downhole orientation tool in more detail. With reference to FIG. 8, the steps involved in installing the downhole orientation tool are explained. Firstly, at step 8.2 the downhole orientation tool device is co-located with the fiber optic cable in a clamp, as described previously with respect to FIG. 7. In this respect, the clamps 12 are fastened around the production tubing with the fiber optic cable and the downhole orientation tool therein, as the production tubing is being fed into the well. At step 8.4 the production tubing is installed into the well, and once the production tubing is in place within the well, the orientation device is activated, at step 8.6. Alternatively, in one embodiment the orientation device 22 may be activated prior to being installed in the clamp, and operate constantly until its battery runs out. In this respect, the intended purpose of the downhole orientation tool in one embodiment is to determine the orientation of the clamps 12, and hence any fiber held by the clamps, immediately after installation of the production tubing in the well. Once the production tubing is installed within the well, then usually it would not move much over time, and hence there is no need in some embodiments for the downhole orientation tool to continue to operate, once orientation measurements have been taken.

Once the production tubing is installed within the well and the device 22 has been activated, FIG. 10 shows the steps involved within the device 22 itself. That is, at step 10.2 with the device activated, the accelerometer then switches on, and starts to send orientation signals with respect to gravity to the micro controller, at step 10.4. At step 10.6, the micro controller receives the signals from the accelerometer, and determines the downhole orientation tool's orientation with respect to gravity. As explained previously with respect to FIG. 5, the micro controller receives the accelerometer signals, and then codes them into a form suitable for transmission. This encoding may, for example, include packetisation of the accelerometer data into a data packet, including appropriate headers, and error correction coding. The encoded accelerometer data is then used to modulate the output of the vibrator 36 in accordance with a known acoustic modulation scheme, to produce a modulated acousto-vibrational signal that encodes the orientation of the downhole orientation tool, at step 10.8. The resulting acoustic vibrations from the vibrator 36 then travel to the fiber optic cable 14, via the clamp if necessary, where they are incident on the fiber optic cable, causing backscatter and/or reflected signals to occur from the incident section of fiber. The backscatter and/or reflected signals are then detected by the attached DAS equipment 62.

At the DAS equipment 62, as shown at step 9.2, the orientation device-generated vibrational signals are received via the optic fiber 14 at the DAS, and the DAS is then able to determine the incident vibrational signals, which can then be demodulated and decoded to give the device orientation. Once the device orientation settles is known, because it is also known that the device is substantially co-located with the optical fiber 14, then the location of the optical fiber 14 around the circumference of the casing 10 in the vicinity of the clamp can be inferred. By inferring the location of the optical fiber 14 in this manner, when perforation of the casing is being performed using a perforating gun, the perforating gun may be controlled so as to avoid perforating the casing at the inferred position of the optical fiber 14. In this respect, here we assume that the cable is in a generally straight path between each cable clamp and does not wrap completely around the tubing in the short distance between two clamps; this ensures that the typical spatial resolution (~3-15 m) between the clamps is adequate to allow perforating between clamps without risk of damaging the cables.

A second embodiment of the invention will now be described. This embodiment is related to the first embodiment, and many aspects thereof that are identical are not described. Where the second embodiment differs is that instead of using an accelerometer and associated microcontroller, a simpler rotational sensor, which may simply be a weighted rotational potentiometer or Hall effect sensor, is provided, together with an accompanying dedicated electronics processing pack (rather than a programmable microprocessor).

In more detail, in the second embodiment the downhole orientation tool utilizes a weighted rotational sensor to measure the orientation of gravity relative to the tool. The sensor output is then transformed to an acoustic or mechanical strain signal using a mechanical or electromechanical device such as but not limited to a solenoid, piezoelectric material, speaker, or vibrator. The acoustic signal is detected by the FOC which is connected to a distributed acoustic sensor (DAS) system, as in the first embodiment. The acoustic signal measured by the DAS system is read at the surface and transformed back into the accelerometer data. The accelerometer data gives the orientation of the DOT relative to gravity.

The acoustic-mechanical signal generator can take many forms to optimize the signal for detection by the fiber.
1. In the second embodiment, the following steps are therefore performed:
2. rotational sensor settles with the weight downward as a result of gravity
3. Rotational sensor position is measured using a hall-effect sensor which outputs a voltage signal proportional to the angle.
4. The electronics pack converts the voltage signal to orientation and translates orientation to an output signal sent to vibrator
5. Vibrator generates mechanical signal
6. DOT Vibrates at specific frequency or interval. The frequency or interval is dependent on the orientation
7. Fiber optic control line is vibrated by vibrator
8. DAS surface interrogator measures vibration
9. Vibration translated back to orientation FIG. 14 is a section along the line A-A of FIG. 1, but applied to the second embodiment, and which illustrates the internal contents of a clamp body 12 according to the second embodiment. In particular, from FIG. 14 it can be seen that a clamp 12, attached to the side of casing 10, contains fiber optical cable 14, as well as the downhole orientation tool device 122, which is co-located next to the fiber optic cable 14 within the clamp body 12. By co-locating the downhole orientation tool 122 with the fiber optic cable, then any orientation that is determined for the downhole orientation tool 122 should also substantially correspond to the fiber optical cable.

FIG. 13 shows a section along the line B-B of FIG. 14. Here it can be seen that the downhole orientation tool device 122 comprises an outer casing, within which is contained a relative bearing sensor 132, which is arranged to communicate with an electronics package 134. The electronics package 134 receives signals from the relative bearing sensor, and determines the orientation of the downhole orientation tool with respect to gravity, in a manner to be described. Having determined the orientation with respect to gravity, the electronics package 134 then controls a vibrator 36, to vibrate in a specific pattern in order to communicate the determined orientation. That is, the vibrator 36 produces a modulated vibro-acoustic signal that encodes the determined orientation, as determined by the electronics package. The components of the downhole orientation tool 122 are powered by a battery 38.

Figure 15:
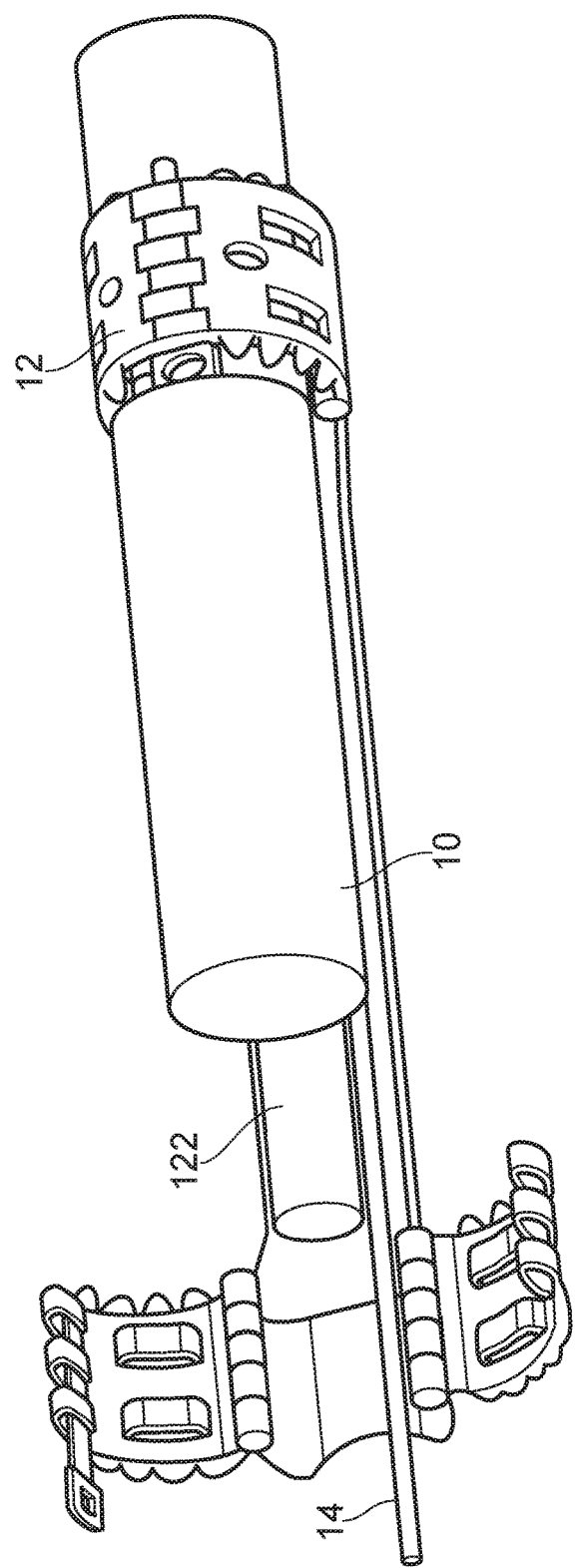
FIG. 15 is an illustration of a clamp used in the second embodiment of the invention.

In operation the DOT 122 is co-located with the fiber optic cable 14 within the clamp 12, as shown in FIG. 15, and for example may be located at an angle of approximately 300 degrees from the vertical orientation, as measured clockwise when looking downhole. In this respect, the vertical orientation can be determined as being the opposite of the gravitational direction determined by the three axis accelerometer in the DOT 122. Therefore, briefly, the relative bearing sensor 132 determines the 300 degree orientation, and passes this information to the electronics package 134. The electronics package 134 encodes the orientation information (for example, using ASCII encoding or the like) into a suitable control signal which is then used to modulate the output of the vibro-acoustic vibrator 36. Various acoustic modulation schemes are known in the art, such as the well-known pulse width modulation schemes used to record data onto magnetic tapes. Alternatively, various frequency modulation schemes, such as, for example, DTMF related schemes may also be used.

The vibro-acoustic vibrations produced by the vibrator 36 are felt by the fiber optic cable 14, causing back scatter from the section of cable adjacent to the downhole orientation tool 122, which back scatter can then be detected by the distributed acoustic sensor box 62, the modulated acoustic signal from the vibrator 36 being determined therefrom. The modulated acoustic signal is then demodulated to retrieve the encoded orientation information. The encoded orientation information may then be decoded, and the decoded orientation information then output on the screen 64, as shown.

FIG. 15 illustrates an example clamp 12, arranged around a section of casing 10, which has a fiber optic cable 14 running there-along. In this case the clamp 12 has two closing sections and a bridging section, and located underneath this bridging section is the downhole orientation tool 122, attached to the bridge. When the closing sections are closed, the downhole orientation tool 122 is then brought and held against the optical fiber 14. In this way, the clamp 12 holds the downhole orientation tool device 122 against or near to the fiber optic cable 14, such that there is a good vibrational connection there between.

Figure 16:
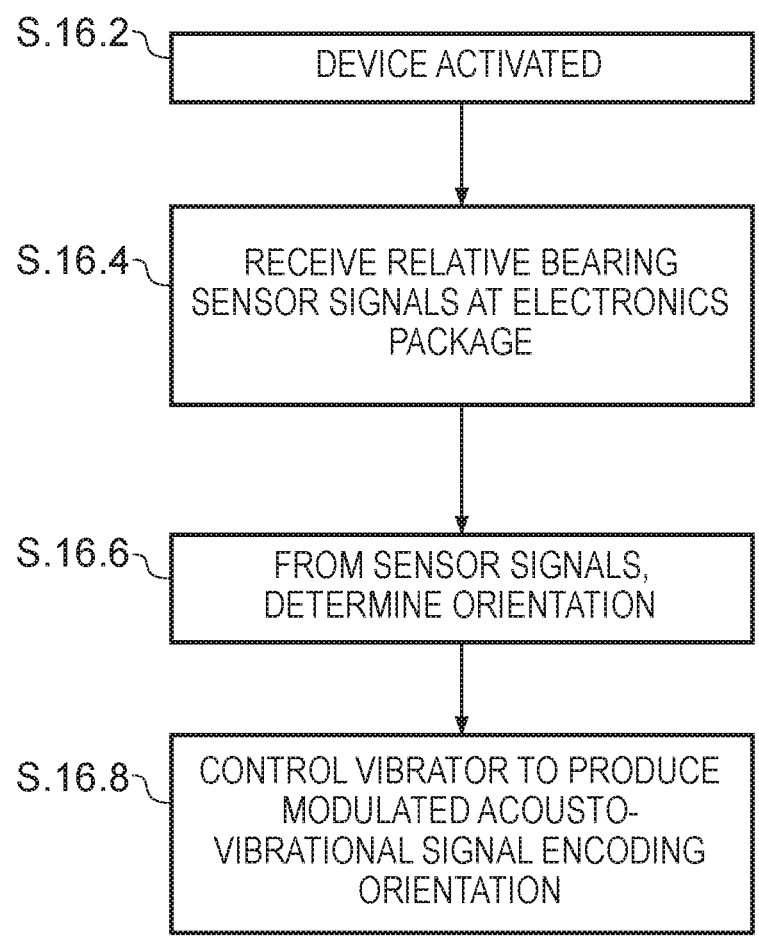
FIG. 16 is a flow diagram of a process used in the second embodiment of the invention.

With respect to the operations of the second embodiment, as mentioned it is substantially the same as the first embodiment, and the processes of FIGS. 8 and 9 described previously still apply. Inside the DOT of the second embodiment the process of FIG. 16 is followed, rather than that of FIG. 10. This is described further below.

Once the production tubing is installed within the well and the device 122 has been activated, FIG. 16 shows the steps involved within the device 122 itself. That is, at step 16.2 with the device activated, the relative bearing sensor then switches on, and starts to send orientation signals with respect to gravity to the electronics package, at step 16.4. At step 16.6, the electronics package receives the signals from the relative bearing sensor, and determines the downhole orientation tool's orientation with respect to gravity. As explained previously with respect to FIG. 5, the electronics package receives the relative bearing sensor signals, and then codes them into a form suitable for transmission. This encoding may, for example, include packetisation of the accelerometer data into a data packet, including appropriate headers, and error correction coding. The encoded accelerometer data is then used to modulate the output of the vibrator 36 in accordance with a known acoustic modulation scheme, to produce a modulated acousto-vibrational signal that encodes the orientation of the downhole orientation tool, at step 16.8. The resulting acoustic vibrations from the vibrator 36 then travel to the fiber optic cable 14, via the clamp if necessary, where they are incident on the fiber optic cable, causing backscatter and/or reflected signals to occur from the incident section of fiber. The backscatter and/or reflected signals are then detected by the attached DAS equipment 62.

With the above second embodiment, therefore, the same advantages and effects as the first embodiment can be obtained, but with slightly lower cost and simpler components. In particular, the replacement of the accelerometer with a relative bearing device may increase robustness, and replacing a generally programmable microprocessor with a specific (and dedicated) electronics pack may reduce cost.

Various modifications may be made to the above described arrangements to provide additional embodiments. Various such modifications are described below.

In one further embodiment the on/off mechanism for the DOT could be a thermostat which is set to power up the DOT on it reaching a certain temperature, higher than ambient but lower than that downhole for the target well (for example, it could be set to 70 C). This would mean the DOT could be completely assembled, sealed and tested in its manufacturing location before shipping to the installation site. On site, there would be minimal scope for getting things wrong and no need to open the unit. Most importantly, it would draw no power until the unit reaches the set temperature.

As a variant to the above, the DOT may be actuated, or programmed to operate by being exposed to a particular magnetic field, or by being exposed to a certain level of acceleration or shock (e.g. hitting it with a hammer etc.). The general concept is to provide an external initiation signal that causes the unit to start operating, without requiring an external switch. By doing so the casing of the DOT can remain unitary and free of apertures, thus increasing its strength and durability.

In one embodiment the DOT units may also be used for length referencing the fibre length in the completion. This is because each DOT would be at a known position on the tubing string.

In other embodiments a DOT may also fulfil other measurement functions, for example it could measure temperature or pressure and send out these values as an acoustic signal.

Moreover, in some embodiments a DOT may scavenge energy from the wellbore (for example vibrational energy) to allow it to take periodic measurements.

Furthermore, in some embodiments a DOT may output its value as a tone, the frequency of which encodes the value being transmitted. An alternative is to tap the orientation values out in a binary code, however, a tone is easier to produce, needs less energy and is easier for a DAS to decode than a binary code. As mentioned previously, dual-tone multi-frequency (DTMF) tones may be used, where numbers are to be communicated.

In another embodiment it is also possible to actuate and/or communicate to a downhole device by sending seismic messages or by tapping at the wellhead. In this respect, a downhole device such as the DOT device is also provided with a microphone or other acoustic transducer with which it is able to listen for vibrational or acoustic signals. With such additional provision a closed loop arrangement is possible where the downhole device uses the optical fiber DAS system to communicate signals back to the surface via its own local vibrational transducer, and then the surface is able to communicate back to the device via the seismic messages and/or tapping at the well head (which is then transmitted along the well tubing). With such an arrangement the DAS system may connect/collect data from one or more downhole wireless sensors. However, a 2-way communication can also be created which can be done by an acoustic or seismic source (212) at the surface, near the surface or sub-surface, with the DAS then being used to also confirm that the signal has been communicated/received to the point of interest i.e. at the downhole device.

Figure 21:
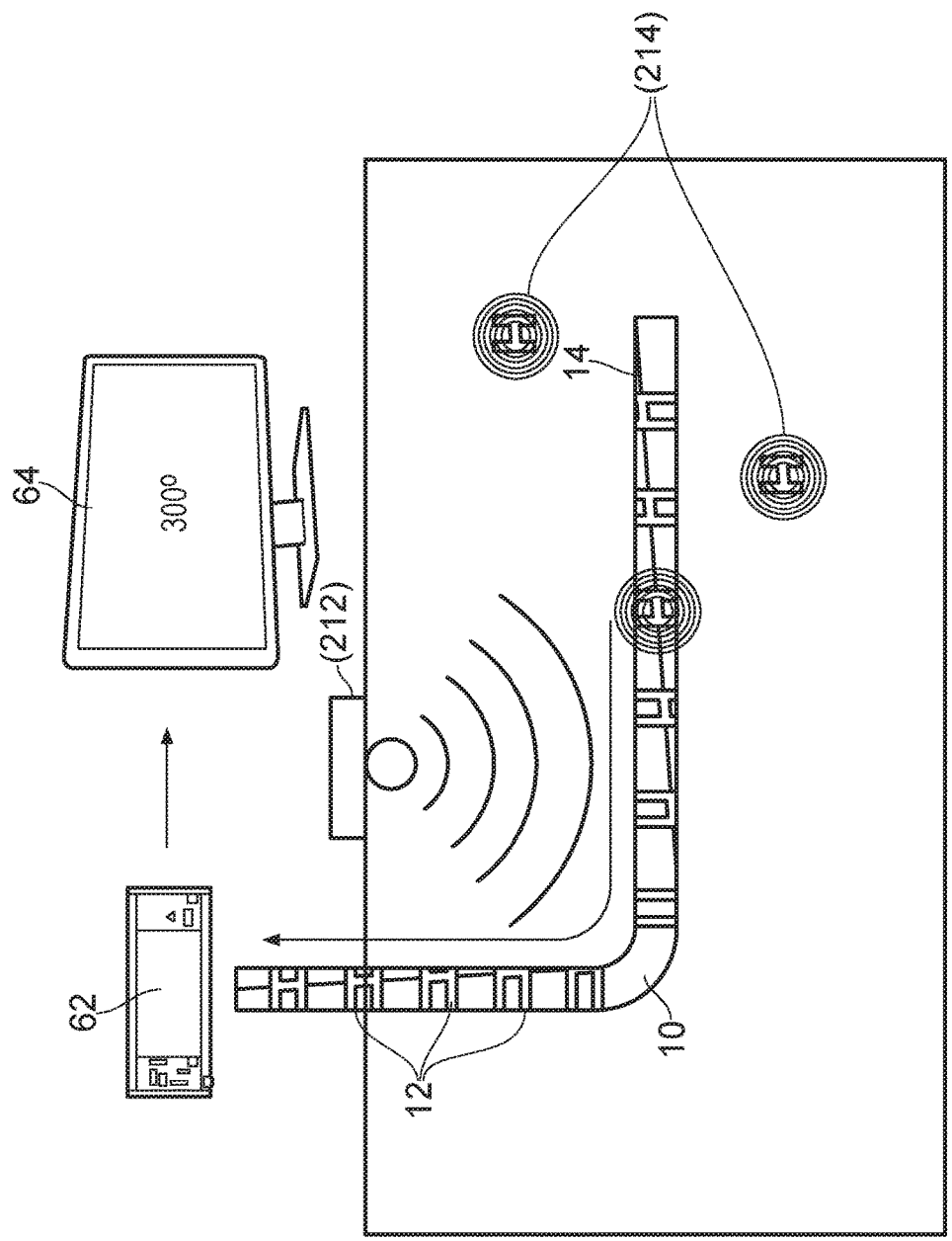
FIG. 21 is a block diagram illustrating a further mode of operation of embodiments of the invention.

FIG. 21 illustrates such an arrangement. As previously, here casing 10 is provided with an optical fiber held in place by clamps 12. DAS system 62 interrogates the optical fiber by sending optical pulses therealong and detecting the backscatter and/or reflections that come back from the pulses as they travel along the fiber. From the back scatter and/or reflections, which are modulated along the fiber by incident vibro-acoustic energy, the acoustic field at each location along the fiber can be determined. Within FIG. 21 an acoustic or seismic source 212 is provided at or near the surface, or under the surface, which is used to generate acoustic or seismic signals, the information content of which can be modulated to convey desired control signals to the remote DOT devices. Remote sensing devices (214), which may be in the same form as the DOT devices described herein, or may take other forms, but which can send data vibro-acoustically are further provided. Localisation of such devices can be undertaken using array processing techniques, for example based on the distributed acoustic data from the DAS system 62. Deployment of the remote sensing devices 214 can be undertaken by them being pumped or injected or deployed on the surface, subsurface and/or subsea.

In addition, such a sensing arrangement need not necessarily be deployed only in subterranean or downhole environments, but can be deployed more generally, such as on land, at sea, or subsea. For example, the optical fiber of the distributed acoustic sensor system may be deployed into any region, area or volume in which sensing is to be undertaken. Remote sensing devices such as devices (212) can then be deployed throughout the region to sense the local conditions thereto and/or respond to local stimuli. Such local conditions and/or stimuli may include (but not be limited to) orientation of the device, local temperature at or near the device, local pressure at or near the device, local lighting conditions at or near the device, local radio conditions at or near the device, local electromagnetic conditions, such as for example, magnetic field, at or near the device, local gravitational conditions at or near the device, local seismic conditions at or near the device, or any other conditions or stimuli that might be measured, in any combinations. Whichever local conditions or stimuli are then measured or sensed by the remote devices, the remote devices then encode the sensed or measured information as vibro-acoustic data, for example by appropriate modulation of properties of an acoustic signal, and produce acoustic vibrations to reproduce the vibro-acoustic data. The acoustic vibrations are then detected by the optical fiber of the distributed acoustic sensor system, resulting in the communication of the acoustic vibrations back along the optical fiber (by way of modulated backscatter and/or reflections) to the processing box of the DAS system, where they are decoded and interpreted to receive the information relating to the local conditions and/or stimuli around the respective remote devices 212.

Furthermore, although in most of the above embodiments we envisage the DOT devices to be battery powered, in other embodiments they could be powered by a power wireline from the surface, Multiple DOTs could be powered from a single power line, with appropriate power tap-offs.

A further embodiment of the invention will now be described with respect to FIGS. 17 to 20.

Figures 17, 18:
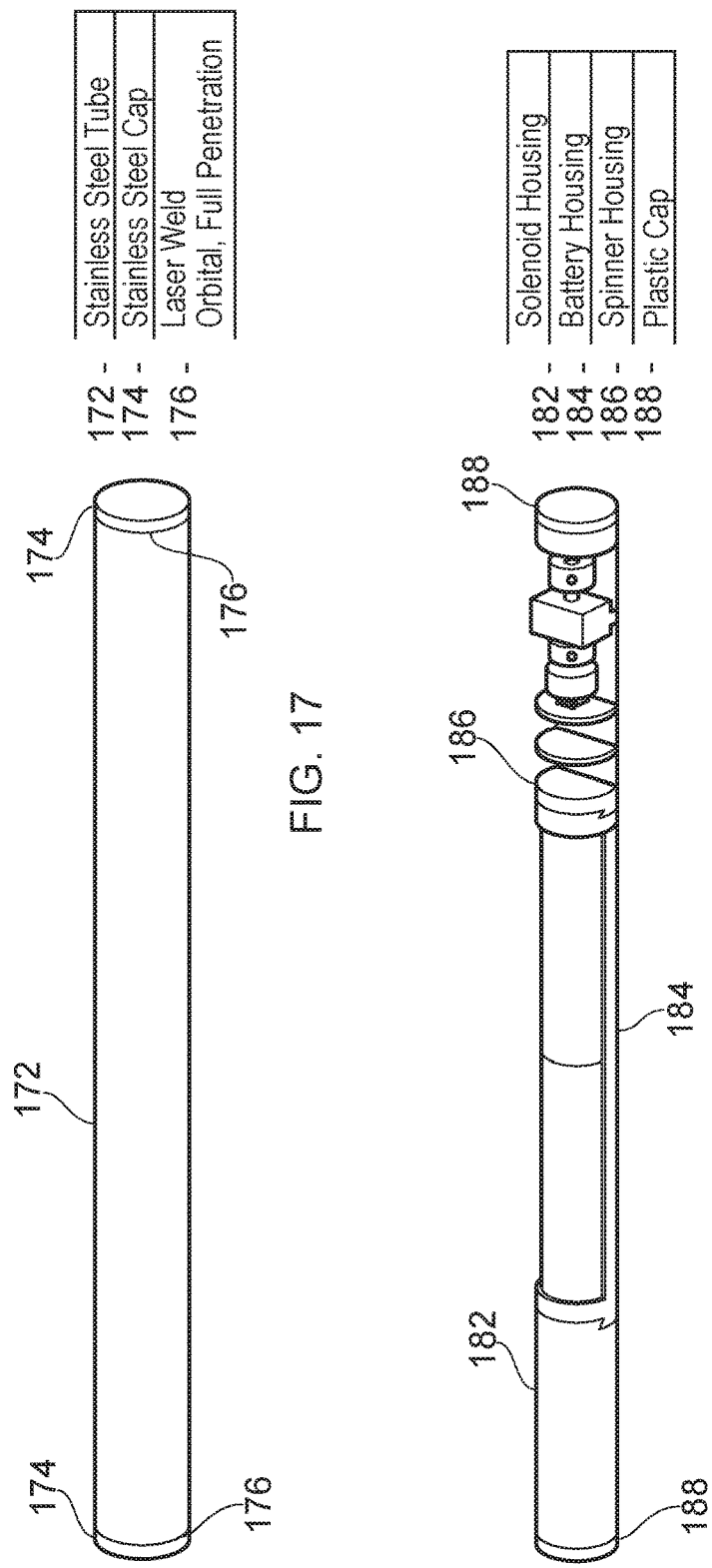
FIG. 17 is diagram of a further embodiment of the invention.
FIG. 18 is a diagram of the internal components of the embodiment of FIG. 17.

A further version of a DOT device according to a further embodiment of the invention is shown as cylindrical tube 172 in FIG. 17. In this respect cylindrical tube 172 is formed from stainless steel, and is provided at both ends with respective caps 174, also made from stainless steel. The caps 174 are respectively laser welded all the way around their circumferences to secure them to the stainless tube with a fluid tight seal.

FIG. 18 shows the interior of the stainless steel tube 172. Here, the components are arranged in a cylindrically stacked configuration so as to allow them to be fitted inside the stainless steel tube 172. As shown in FIG. 18, the DOT according to this embodiment comprises a solenoid housing 182, within which is included a solenoid or other electromechanical actuator that is able to produce a mechanical movement in response to the application of an electrical signal. For example, other suitable actuators may be high temperature piezo-electric actuators, or the like.

In-line with the solenoid (or actuator) housing is a battery housing 184, which in use contains one or more batteries, such as AA, or AAA batteries, that are used to provide power to the device. Next in line (from left to right in FIG. 18) is a spinner housing, within which is contained a rotatable and associated detection and control electronics to detect rotational orientation of the spinner, and to control the solenoid or other actuator accordingly. Further details of the spinner housing 186 will be described below with respect to FIG. 20. Finally, the arrangement is capped at both ends by respective caps 188 that act to secure the arrangement within tube 172, and to provide a fluid tight seal at each end with the interior surface of the tube 172.

Figure 19:
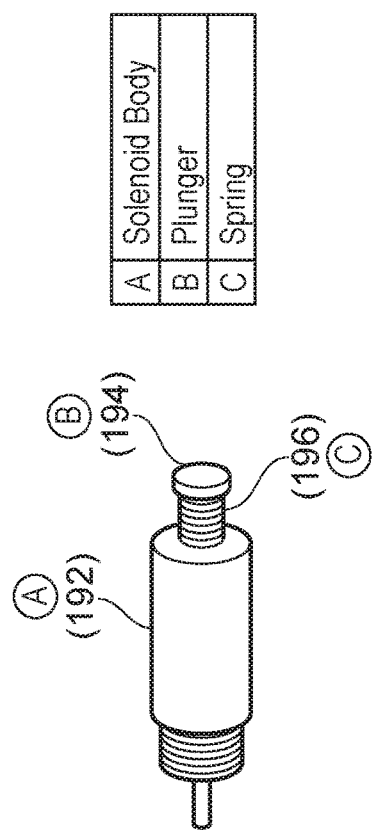
FIG. 19 is a diagram of a solenoid used in the embodiment of FIG. 17.

FIG. 19 shows further details of the solenoid used as the actuator in one embodiment. The solenoid body is of standard construction as is known in the art, having a metal plunger extending through the centre of the solenoid body. Inside the solenoid body are a plurality of turns of wire, as is known in the art. The plunger is provided at one end with a cap providing a shoulder for a spring that is arranged coaxially with the plunger therearound, and which abuts against the shoulder and the solenoid body to provide a spring return of the plunger to its rest position once it has been moved by the solenoid coil. The plunger extends through the entire body of the solenoid and extends out the other side via a plunger extension of reduced diameter that acts as a tapper, for example to tap on the underside of cap 188 so as to produce impulse like acoustic noises. As will be described later, the frequency of such a tapping signal can be controlled in such a way as to convey information relating to the orientation of the DOT device when it is in place.

Figure 20:
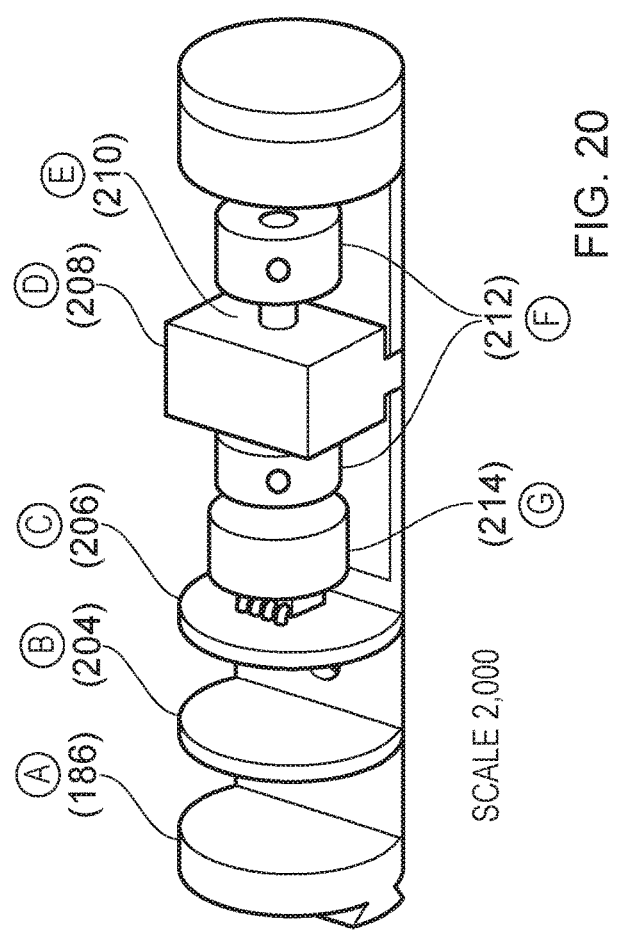
FIG. 20 is a diagram of some of the internal components of the embodiments of FIG. 17.

FIG. 20 illustrates the spinner housing 186 in more detail. Within the spinner housing 186 two printed circuit boards are provided, a first PCB 204 having mounted thereon a thermal switch. The thermal switch is set to activate when the ambient temperature is increased to that of the intended operating environment i.e. downhole temperature. The thermal switch controls the rest of the on-board electronics to activate at that point.

The second PCB 206 has mounted thereon a microcontroller, arranged to interface with a brass magnet holder 214 that forms part of a magnetic sensor, arranged to detect the rotational position of two offset magnetic weights 212 mounted on a shaft. The weights 212 are arranged offset to the shaft such that shaft extends off-center through the weights, whereby the off-center weights rotate about the shaft in an eccentric manner. The shaft is held in place by a bearing 210, which is fixed in place with respect to the spinner housing by a bearing housing 208, mounted on the spinner housing 186. In use the offset magnetic weights rotate under gravity such that the greater part of their mass hangs below the off-center shaft, and the rotational position of the weights is detected by the magnetic sensor 214, and fed to the microcontroller. The microcontroller then controls the solenoid to tap at a certain rate in dependence on the rotational position of the weights. The rotational position of the weights about the shaft is indicative of the orientation of the DOT as a whole, as will be described further below.

In further detail, the operation of the above described arrangement is as follows:

1) The DOT is installed downhole and allowed to settle into position. Gravity direction is then detected by the magnetic weights 212 mounted on the spindle with the mass of the weights 212 being off-axis. The magnetic sensor 214 detects the position of the rotatable magnetic weights, as described above.
2) The DOT transmits a signal representing the detected angular orientation as a pulsing of the solenoid 192. The angle is encoded as the pulsing frequency.
3) The apparatus is sealed at manufacture (so that no interaction is needed at the well site) and comes alive in the following manner:
    a. After being installed downhole the ambient temperature is increased, and at the predetermined activation temperature the electronics is activated using the thermal switch 204. This means that the device draws no power until this condition is met, allowing the device to be sealed at manufacture many months before deployment.
    b. After activation the device then draws minimal power until no motion has been detected from the sensor for a predetermined period (for example around 4 hours) which should belong enough that the user knows the casing has "landed" i.e. settled into position.
    c. After this time period the solenoid turns on (i.e. only then is significant power drawn), and the microprocessor measures the rotational orientation of the offset weights, to determine the angular orientation of the device.
4) In order to communicate the determined orientation of the device, in this embodiment the solenoid 192 taps out a set frequency to encode the detected angle in the range 0 deg to 360 deg. The set frequency will typically be in the range of 1 Hz to 5 Hz, taking into account the following:
    a. The frequencies used should be selected to ensure that pulsed frequencies are not multiples of one-another such that harmonics cannot be confused with fundamental frequencies. For example, 2 Hz should not be used if 1 Hz is also being used. Instead, a slightly larger or smaller frequency such as, for example, 2.1 Hz should be used. Set out in table form below is a suitable selection of frequencies for a 20 deg resolution using a frequency range of 1.1 Hz to 4.7 Hz. Note, in this embodiment, the frequencies are a set of quantised (digital) values rather than continuous (analogue) values. This prevents the harmonic issue described above, but in addition this pre-knowledge of what the possible set of frequencies helps to pick confidently the correct frequency/angle in the signal detection/processing stage. For example, similar processing to that used in a lock-in amplifier can be used to better identify the actual frequency from the limited number of possible frequencies.
    b. Another ("out of band") frequency is used (say 0.5 Hz) for "no angle detected"—i.e. a fault
    c. Another ("out of band") frequency is used (say 0.7 Hz) for another status update (for example, "I have reached operating temperature, have stopped moving and am waiting for the set time to be reached")
    d. A more complex pulse pattern may be sent periodically (say once an hour) giving a unique device identification code. This can be used to give additional clarification on which device is located where.
    e. The device may tap out continuously (or "dense periodically", such as 10 s every 1 minute) for around 12 hours and then less frequently over the next few days or weeks (such as 10 s every hour for 2 days then 10 s every 6 hours thereafter). This mode is to allow a long period of operation in the case the user misses the first "dense" window of operation or if the user wish to confirm the initial measurements.

The table below indicates example tapping frequencies for detected orientation angle in one embodiment. Of course, in other embodiments different tapping frequencies may be used to encode different angles.

TABLE 1

Tapping frequencies for particular angular rotations

| Angle (°) | Freq (Hz) |
| --- | --- |
| 0 | 1.1 |
| 20 | 1.3 |
| 40 | 1.5 |
| 60 | 1.7 |
| 80 | 1.9 |
| 100 | 2.1 |
| 120 | 2.3 |
| 140 | 2.5 |
| 160 | 2.7 |
| 180 | 2.9 |
| 200 | 3.1 |
| 220 | 3.3 |
| 240 | 3.5 |
| 260 | 3.7 |
| 280 | 3.9 |
| 300 | 4.1 |
| 320 | 4.3 |
| 340 | 4.5 |

With the above arrangement, therefore, a robust downhole orientation determination device is provided that is temperature activated, and provides information back to the surface by tapping at one or more predetermined frequencies indicative of sensed orientation. As in the previous embodiments, the tapping can be detected and measured by a DAS system, to allow the orientation of the device to be found.

One constraint that can limit downhole operation are the high ambient temperatures that may be experienced, and in particular the limit most likely being availability of high temperature batteries.

In order to address this issue, in some embodiments, non-chemical (i.e. not battery) energy storage mechanisms may be provided to power the DOT. For example, in one embodiment a wind-up micro generator may be provided that starts unwinding at a set temperature. Alternatively, in another embodiment a compressed air powered generator may be provided, which uses compressed air to power a micro-generator. In both cases, the time we could power the sound source may be very limited, but provided the signal is detected soon after actuation this is of little concern, as once installed the position will not change. In addition, it should also be possible to provide a completely mechanical DOT, where a mechanical means is used to decode detected orientation angle to tapping frequency, and to power the tapper. For example a balance wheel type clockwork powered mechanism may be provided where the regulator lever on the balance spring is linked to the offset weights such that rotation of the offset weights adjusts the regulator lever so as to alter the oscillation of the balance wheel, and hence the resultant tapping frequency generated via a tapping mechanism driven by the balance wheel oscillation.

In further embodiments, inductive charging of the DOT batteries may be possible, for example where there is a hybrid electric/fiber optic cable and inductive charging circuitry is included, as discussed previously.

Various further modifications to the above described embodiments may be made, whether by way of addition, deletion, or substitution, to provide further embodiments, any and all of which are intended to be encompassed by the appended claims.

The invention claimed is:

1. An apparatus, comprising:
   i) an orientation detector arranged to detect the orientation of the apparatus;
   ii) a vibrational or acoustic source arranged to produce vibrational or acoustic signals in dependence on the detected orientation of the apparatus, the produced vibrational or acoustic signals representing the detected orientation, and
   iii) initiation circuitry arranged to detect an external initiation condition that indicates that the orientation detector and vibrational and/or acoustic source should begin to operate, and to control the apparatus to begin operating, the apparatus remaining quiescent until such condition is detected, the initiation circuitry being further arranged to control the apparatus to go into a standby condition after at least one orientation is detected.

2. An apparatus according to claim 1, wherein the orientation detector is a three-axis accelerometer that detects the orientation of the apparatus with respect to the direction of gravity.

3. An apparatus according to claim 1, wherein the orientation detector comprises one or more offset rotatably mounted magnetic masses, and a magnetic detector arranged to detect the rotational orientation of the offset magnetic masses.

4. An apparatus according to claim 1, wherein the orientation detector is a relative bearing sensor.

5. An apparatus according to claim 1, wherein the vibrational or acoustic source is arranged to generate a modulated vibrational or acoustic signal that encodes information pertaining to the detected orientation.

6. An apparatus according to claim 5, wherein the vibrational or acoustic signal is frequency modulated whereby to encode the information pertaining to the detected orientation.

7. An apparatus according to claim 6, wherein the frequency modulation comprises selection of one or a set of predetermined modulation frequencies corresponding to respective predetermined orientations.

8. An apparatus according to claim 7, wherein the set of predetermined modulation frequencies are selected such that no member of the set is a harmonic frequency of any other member of the set.

9. An apparatus according to claim 1, wherein the vibrational or acoustic source is an impulse source that generates vibrational or acoustic impulses at one or more frequencies corresponding to respective one or more detected orientations.

10. An apparatus according to claim 1, and further comprising a sealed case within which the orientation detector and the vibrational and/or acoustic source are contained.

11. An apparatus according to claim 1, wherein the external initiation condition is one or more of: i) a magnetic field of at least a predefined activation value; ii) an acceleration or shock of at least a minimum predefined activation value; iii) a temperature of at least a minimum predefined activation value; or iv) a duration of a predetermined time value;
   wherein the predefined activation values are greater than typical ambient values.

12. An apparatus according to claim 1, and further comprising:
   i) a clamp for clamping optical fiber to tubing or casing, the orientation detector and the vibrational and/or acoustic source being co-located within the clamp with the optical fiber.

13. An apparatus according to claim 1, and further comprising control circuitry arranged to receive an orientation signal from the orientation detector, to determine the orientation of the device in dependence on the orientation signal, and to control the vibrational or acoustic source so as to produce vibrational or acoustic signals encoding the determined orientation.

14. A distributed acoustic sensor system, comprising an optical fiber deployed along a well bore and a signal processing apparatus arranged to receive optical backscatter and/or reflections from along the optical fiber and to process such backscatter and/or reflections to determine vibrational and/or acoustic signals incident on the optical fiber, the optical fiber being collocated at one or more positions along the well bore with an apparatus according to claim 1, vibrational or acoustic signals from said apparatus being detected by said distributed acoustic sensor system and processed to thereby determine the orientation of the apparatus.

15. A well or borehole arrangement, comprising production tubing having a plurality of clamps affixing one or more optical fibers to the surface thereof, one or more of said clamps containing an apparatus according to claim 1.

16. An apparatus according to claim 1, wherein the external initiation condition is not an external switch.

17. An apparatus according to claim 1, wherein the apparatus is unitary and free of apertures.

\* \* \* \* \*